United States Patent
Chen et al.

(10) Patent No.: US 9,900,778 B2
(45) Date of Patent: Feb. 20, 2018

(54) METHOD AND APPARATUS FOR SECURING TIMING PACKETS OVER UNTRUSTED PACKET TRANSPORT NETWORK

(71) Applicant: Nokia Solutions and Networks Oy, Espoo (FI)

(72) Inventors: David T. Chen, Wilmette (IL); Umamaheswar Kakinada, Carpenterville, IL (US); Mohammed Petiwala, Wheeling, IL (US); Mohsin Zia, Elmhurst, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/476,030

(22) Filed: Mar. 31, 2017

(65) Prior Publication Data

US 2017/0208473 A1    Jul. 20, 2017

Related U.S. Application Data

(63) Continuation of application No. 14/718,271, filed on May 21, 2015, now Pat. No. 9,615,258.

(51) Int. Cl.
*H04L 29/06* (2006.01)
*H04W 12/10* (2009.01)
(Continued)

(52) U.S. Cl.
CPC ........... *H04W 12/10* (2013.01); *H04J 3/0661* (2013.01); *H04L 43/106* (2013.01);
(Continued)

(58) Field of Classification Search
None
See application file for complete search history.

(56) References Cited

U.S. PATENT DOCUMENTS

| | | | |
|---|---|---|---|
| 2002/0061012 A1 | 5/2002 | Thi et al. | |
| 2003/0018908 A1* | 1/2003 | Mercer | H04L 63/0485 |
| | | | 713/193 |

(Continued)

FOREIGN PATENT DOCUMENTS

| | | |
|---|---|---|
| EP | 2725836 A1 | 4/2014 |
| WO | WO-2011/038013 A2 | 3/2011 |

OTHER PUBLICATIONS

IEEE Std 802.1 AS-2011; "IEEE Standard for Local and Metropolitan Area Networks—Timing and Synchronization for Time-Sensitive Applications in Bridged Local Area Networks"; Mar. 30, 2011; 292 pages; IEEE Compuer Society; Sponsored by th LAN/MAN Standards Committee; IEEE; 3 Park Avenue; New York; NY 10016-5997; USA.

(Continued)

*Primary Examiner* — Eric Chen
(74) *Attorney, Agent, or Firm* — Harrington & Smith

(57) ABSTRACT

Methods, devices, systems, techniques, and computer program products are provided to secure timing synchronization to network nodes connected over an inherently insecure best effort public network with mechanisms to improve accuracy of timing protocols such as a statistically estimated edge timestamp offset encoded into the timing message to account for network jitter and processing latency variances incurred due to the security packet processing and encryption; to ensure slave network nodes shall only accept timing messages from trusted timing sources; to establish a secure tunnel with a trusted timing source for exchange of timing packets; to provide authentication and security for timing packets over the insecure public network; and to enhance message anonymity with variable payload padding.

3 Claims, 8 Drawing Sheets

(51) Int. Cl.
  H04W 12/02     (2009.01)
  H04L 12/26     (2006.01)
  H04L 12/911    (2013.01)
  H04J 3/06      (2006.01)
  H04L 9/32      (2006.01)

(52) U.S. Cl.
  CPC ........ *H04L 47/825* (2013.01); *H04L 63/0428* (2013.01); *H04L 63/164* (2013.01); *H04W 12/02* (2013.01); H04L 63/0272 (2013.01); H04L 2209/80 (2013.01); H04L 2463/121 (2013.01)

(56) References Cited

U.S. PATENT DOCUMENTS

| | | | |
|---|---|---|---|
| 2006/0031922 A1* | 2/2006 | Sakai | H04L 63/164 |
| | | | 726/1 |
| 2006/0184797 A1* | 8/2006 | Weis | H04L 63/126 |
| | | | 713/178 |
| 2009/0190613 A1 | 7/2009 | Finn | |
| 2010/0153742 A1 | 6/2010 | Kuo et al. | |
| 2010/0329125 A1* | 12/2010 | Roberts | H04J 3/0667 |
| | | | 370/241.1 |
| 2011/0141895 A1* | 6/2011 | Zhang | H04L 12/66 |
| | | | 370/235 |
| 2011/0142077 A1* | 6/2011 | Wong | H04J 3/0679 |
| | | | 370/503 |
| 2011/0142079 A1* | 6/2011 | Wong | H04L 41/5009 |
| | | | 370/503 |
| 2013/0155945 A1* | 6/2013 | Chen | H04J 3/0661 |
| | | | 370/328 |
| 2014/0280717 A1 | 9/2014 | Frost et al. | |

OTHER PUBLICATIONS

3GPP TS 33.320 V12.1.0 (Sep. 2014); "3rd Generation Partnership Project; Technical Specification Group Services and System Aspects; Security of Home Node B (HNB) / Home evolved Node B (HeNB) (Release 12)"; Sep. 2014; whole document (41 pages).

Marvell; "Security Requirements of Time Protocols in Packet Switched Networks"; TICTOC Working Group; IETF Draft; Jul. 21, 2014; raft-ietf-tictoc-security-requirements-11.txt; whole document (36 pages).

Huawei Technologies; "IPsec security for packet based synchronization"; TICTOC; IETF Draft; Sep. 16, 2011; draft-xu-tictoc-ipsec-security-for-synchronization-02.txt; whole document (15 pages).

IEEE; "IEEE Standards Interpretations for IEEE Std 1588™-2008 IEEE Standart for Precision Clock Synchronization Protocol for Networked Measurement and Control Systems"; Dec. 2011; whole document (28 pages).

Pathan, Y. et al.; "Analysis of selective packet delay attack on IEEE 1588 Precision Time Protocol"; Apr. 25, 2014;University of Colorado at Boulder, TLEN 5710; whole document (21 pages).

IEEE Std 1588-2008 (Revision of IEEE Std 1588-2002); "IEEE Standard for a Precision Clock Synchronization Protocol for Networked Measurement and Control Systems"; IEEE Instrumentation and Measurement Society; Jul. 24, 2008; whole document (289 pages).

* cited by examiner

| $t_2$ | Packet Id |
|---|---|
|  |  |
|  |  |
FIG. 4B – An Example of a Tabulation
| $t_3$ | $t_3'$ | $t_3'-t_3$ |
|---|---|---|
|  |  |  |
|  |  |  |
|  |  |  |
|  |  |  |
FIG. 4C – An Example of another Tabulation
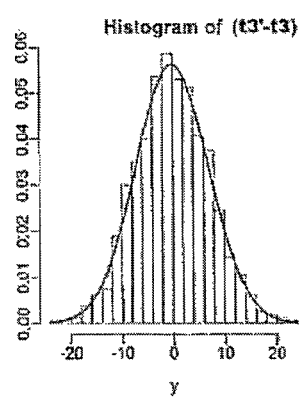
FIG. 4D – An Example of a Histogram Used to Calculate a Mean

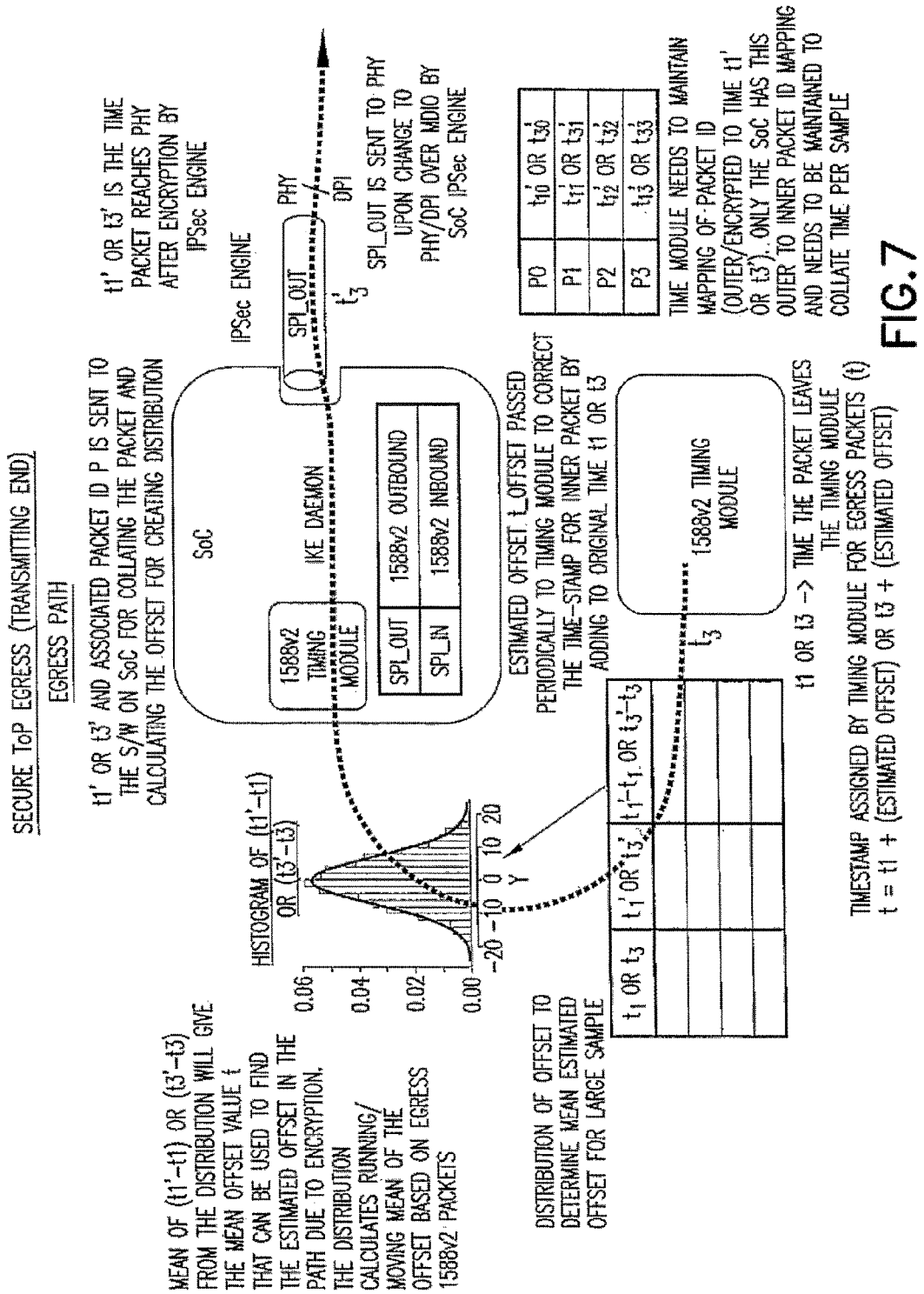

METHOD AND APPARATUS FOR SECURING TIMING PACKETS OVER UNTRUSTED PACKET TRANSPORT NETWORK

RELATED APPLICATIONS

This application is a continuation of U.S. application Ser. No. 14/718,271, titled "Method and Apparatus for Securing Timing Packets Over Untrusted Packet Transport Network", filed May 21, 2015, which is hereby incorporated by reference in its entirety.

TECHNICAL FIELD

The present application relates generally to providing a secure connection for timing messages over an insecure public network between small cells and a wireless communication network core.

BACKGROUND

Time synchronization is used for various applications. Securing the time protocol is a must for securing the applications that use it. Various network nodes, especially cellular network nodes, have a very critical dependency on accurate time synchronization to provide the required services. Some of these network nodes are entirely dependent on the timing over packet service for their synchronization accuracy and are in the meantime connected to the larger network over an insecure public network.

In 3GPP TS 33.320 ("Security of Home Node B (HNB)/ Home evolved Node B (HeNB)", Section 6.3.1 "Clock Synchronization Security Mechanisms for H(e)NB, it says: "The H(e)NB requires time synchronization with a time server. The H(e)NB shall support receiving time synchronization messages over the secure transport link between H(e)NB and the SeGW."

The security requirement in 3GPP TS 33.320 is due to the fact that most of the H(e)NB are connected to SeGW via public transport and it is important to secure the synchronization messages. This can also apply to the small cell where the importance of securing Timing over Packet (ToP) messages cannot be underestimated as many LTE-Advanced features such as Carrier Aggregation (CA), Coordinated Multipoint (CoMP) transmission/scheduling in DL and reception in UL, and eICIC (enhanced Inter-Cell Interference Coordination) all require very tight synchronization to work properly.

Hardware timestamping based ToP protocols such as IEEE 1588-2008 Precision Timing Protocol (PTP), IEEE 802.1AS-2011 are the operators' preferred solutions that can meet LTE/LTE-A frequency/phase/time-sync requirements. However, it is challenging to secure ToP messages when it involves a large number of nodes that can spans across a large geographic area or multiple transport service provider domains. Also, different transports may have varying transport latencies at different times.

The inherently insecure public network usage for transport connectivity and lack of security in the current standards for ToP protocols (e.g., 1588 PTP, 802.1AS) may degrade various network services or make these vulnerable to different types of security threats.

In general, the security threat on Timing over Packets can be classified into two main categories, namely, attacks on ToP messages and attacks on a ToP network architecture. The attacks may take various forms such as maliciously modifying packets or delaying/dropping packets to impact the timing accuracy significantly.

Regarding attacks on ToP messages, to attack ToP timing carrying messages (e.g., event messages such as PTP Sync, Delay_Req, Delay_Resp, etc.) intended to impact a ToP node's recovered time accuracy or the ability to recover the timing, actions for example such as altering the timestamps/correction fields within relevant messages (e.g. Sync, Delay_resp, etc.) belongs to this group of threats, and so will physically altering their propagation time within the network.

Regarding attacks on a ToP network architecture, this kind of attack can impact the ToP network on a broader scale, for example by manipulating the synchronization topology. A rouge master clock can send out announce messages causing it to be chosen as network best grandmaster to take control over the synchronization within the network. A rogue Boundary Clock (BC) can alter the synchronization of a subset of nodes within the network. A possibly valid change of the residence time within a TC (Transparent Clock) may incur uncertainty larger than that specified for time and therefore an attacker controlling a TC may change this value without detection.

To address accurate time synchronization issues, various solutions were previously created.

While a GPS based timing synchronization may provide a better accuracy, it is not a viable option for various deployment and cost considerations, especially indoors, underground, and/or deep urban canyon.

US20090190613 discusses a method of applying an 'edge' timestamp at the PHY layer along with a packet ID which is then forwarded to a sync recognition layer (post firewall) where it is used to calculate the internal delay associated with decryption and other internal processing steps.

Marvell IETF Draft "Security Requirements of Time Protocols in Packet Switched Networks" (found on the World Wide Web at tools.ietforg/html/draft-ietf-tictoc-security-requirements-11) focuses on a broad set of requirements.

Huawei IETF Draft (found on the World Wide Web at tools.ietf.org/id/draft-xu-tictoc-ipsec-security-for-synchronization-02.txt; expired on Mar. 19, 2012) proposed a new extension to IPsec for carrying 1588v2 related traffic.

IEEE 1588-2008 "IEEE Standard for a Precision Clock Synchronization Protocol for Networked Measurement and Control Systems" Annex K (found on the World Wide Web at standards.ieee.org/findstds/interps/1588-2008.html) defines an experimental security extension to PTP and the security protocol is composed of two basic mechanisms: (1) an integrity protection mechanism through HMAC (Hash-based Message Authentication Code), which uses the Message Authentication Code (MAC) to verify that a received message was transmitted by an authenticated source, was not modified in transit, and it is fresh (i.e., not a message replay); and (2) a challenge-response mechanism, which is used to affirm the authenticity of new sources and to maintain the freshness of the trust relations.

In contrast, our subject matter, disclosed herein below, teaches solutions not envisioned by these references.

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:
- 3GPP: third generation partnership project;
- AP: Access Point;
- BC: Boundary Clock;
- BMC: Best Master Clock;
- CA: Carrier Aggregation;
- CoMP: Coordinated Multipoint;
- DPI: Deep Packet Inspection;
- DNS: Domain Name Server;
- eICIC: enhanced Inter-Cell Interference Coordination;
- eNB or eNodeB: base station, evolved Node B;
- LTE: long term evolution;
- LTE-A: long term evolution-advanced;
- FZ: FlexiZone;
- FZAP: FlexiZone Access Point;
- FZC: FlexiZone Controller;
- GMC: Grand Master Clock;
- GW: Gateway;
- HMAC: Hash-based Message Authentication Code;
- HNB: Home Node B;
- HeNB: Home Evolved Node B;
- IKE: Internet Key Exchange;
- MAC: Message Authentication Code;
- PTP: Precision Time Protocol;
- O&M: Operation and Management;
- SA: Security Association;
- SAD: Security Association Database;
- SPD: Security Policy Database;
- SoC: Software on a chip;
- SPI: Security Parameter Index;
- TC: Transparent Clock;
- ToP or TOP: Timing over Packet;
- TSU: Time Stamp Unit;
- UE: user equipment; and
- v1, v2, etc.: Version 1, version 2, etc.

SUMMARY

Various aspects of examples of the invention are set out in the claims.

According to a first aspect of the present invention, a method comprises assigning, in a first timing module of a first node in a wireless communication system, a first timestamp to a ToP egress packet to a second node in wireless communication system, wherein the egress packet comprises a timestamp when the packet leaves the first timing module, adjusted by an estimated offset, and a packet identification; encrypting the egress packet; marking, in a second timing module, a second timestamp after the encrypting, wherein the encrypting is just prior to the transmitting of the egress packet; calculating an actual offset for the egress packet as the difference between the second timestamp and the first timestamp; and transmitting the egress packet to the second node via a secure transport.

According to a second aspect of the present invention, a method comprises receiving an ingress encrypted ToP packet in a second timing module of a second node in a wireless communication system from a first node via a secure transport; decrypting the ingress encrypted ToP packet to retrieve a ToP packet; and applying a timestamp to the ToP packet using a local timing module.

According to a third aspect of the present invention, a method comprises determining a list of servers for a timing service; resolving specified domain names with secure name servers from the determined list; creating a prioritized list of preferred servers from the specified names; choosing a most preferred server from the created prioritized list to avail timing service; and establishing a secure transport with the most preferred server.

According to a fourth aspect of the present invention, a method comprises establishing a secure transport between a slave node and a timing server node in a communications network; mutually authenticating the slave node and the timing server node; exchanging, between the slave node and the timing sever node, encrypted ToP packets via the secure transport.

According to a fifth aspect of the present invention, a method comprises establishing, based on a security policy database, an internet key exchange security association between a gateway node and an access node in a wireless communication systems; creating multiple child security associations comprising at least one or more security associations to use exclusively for a packet-based two-way message exchange protocol for synchronizing clocks between the gateway node and the access node; collecting the one or more exclusive security associations in a security associations database; embedding, in internet protocol packets at wireless communication nodes, timing information with one of the one or more exclusive security associations from the security association database; creating one or more internet protocol security tunnels between the gateway node and the access node based on the one or more security associations; encrypting the packets; exchanging the packets between the gateway node and the access node; and authenticating the packets with a security parameter index.

An additional exemplary embodiment includes a computer program, comprising code for assigning, in a first timing module of a first node in a wireless communication system, a first timestamp to a ToP egress packet to a second node in wireless communication system, wherein the egress packet comprises a timestamp when the packet leaves the first timing module, adjusted by an estimated offset, and a packet identification; encrypting the egress packet; marking, in a second timing module, a second timestamp after the encrypting, wherein the encrypting is just prior to the transmitting of the egress packet; calculating an actual offset for the egress packet as the difference between the second timestamp and the first timestamp; and transmitting the egress packet to the second node via a secure transport; when the computer program is run on a processor. The computer program according to this paragraph, wherein the computer program is a computer program product comprising a computer-readable medium bearing computer program code embodied therein for use with a computer.

An additional exemplary embodiment includes a computer program, comprising code for receiving an ingress encrypted ToP packet in a second timing module of a second node in a wireless communication system from a first node via a secure transport; decrypting the ingress encrypted ToP packet to retrieve a, ToP packet; and applying a timestamp to the ToP packet using a local timing module; when the computer program is run on a processor. The computer program according to this paragraph, wherein the computer program is a computer program product comprising a computer-readable medium bearing computer program code embodied therein for use with a computer.

An additional exemplary embodiment includes a computer program, comprising code for determining a list of servers for a timing service; resolving specified domain names with secure name servers from the determined list;

creating a prioritized list of preferred servers from the specified names; choosing a most preferred server from the created prioritized list to avail timing service; and establishing a secure transport with the most preferred server; when the computer program is run on a processor. The computer program according to this paragraph, wherein the computer program is a computer program product comprising a computer-readable medium bearing computer program code embodied therein for use with a computer.

An additional exemplary embodiment includes a computer program, comprising code for establishing a secure transport between a slave node and a timing server node in a communications network; mutually authenticating the slave node and the timing server node; exchanging, between the slave node and the timing sever node, encrypted ToP packets via the secure transport; when the computer program is run on a processor. The computer program according to this paragraph, wherein the computer program is a computer program product comprising a computer-readable medium bearing computer program code embodied therein for use with a computer.

An additional exemplary embodiment includes a computer program, comprising code for establishing, based on a security policy database, an internet key exchange security association between a gateway node and an access node in a wireless communication systems; creating multiple child security associations comprising at least one or more security associations to use exclusively for a packet-based two-way message exchange protocol for synchronizing clocks between the gateway node and the access node; collecting the one or more exclusive security associations in a security associations database; embedding, in internet protocol packets at wireless communication nodes, timing information with one of the one or more exclusive security associations from the security association database; creating one or more internet protocol security tunnels between the gateway node and the access node based on the one or more security associations; encrypting the packets; exchanging the packets between the gateway node and the access node; and authenticating the packets with a security parameter index; when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: assigning, in a first timing module of a first node in a wireless communication system, a first timestamp to a ToP egress packet to a second node in wireless communication system, wherein the egress packet comprises a timestamp when the packet leaves the first timing module, adjusted by an estimated offset, and a packet identification; encrypting the egress packet; marking, in a second timing module, a second timestamp after the encrypting, wherein the encrypting is just prior to the transmitting of the egress packet; calculating an actual offset for the egress packet as the difference between the second timestamp and the first timestamp; and transmitting the egress packet to the second node via a secure transport.

An exemplary apparatus includes one or more processors and one or more memories including computer program code. The one or more memories and the computer program code are configured to, with the one or more processors, cause the apparatus to perform at least the following: receiving an ingress encrypted ToP packet in a second timing module of a second node in a wireless communication system from a first node via a secure transport; decrypting the ingress encrypted ToP packet to retrieve a ToP packet; and applying a timestamp to the ToP packet using a local timing module.

An exemplary apparatus includes one or more processors and one or more memories including computer program code. The one or more memories and the computer program code are configured to, with the one or more processors, cause the apparatus to perform at least the following: determining a list of servers for a timing service; resolving specified domain names with secure name servers from the determined list; creating a prioritized list of preferred servers from the specified names; choosing a most preferred server from the created prioritized list to avail timing service; and establishing a secure transport with the most preferred server.

An exemplary apparatus includes one or more processors and one or more memories including computer program code. The one or more memories and the computer program code are configured to, with the one or more processors, cause the apparatus to perform at least the following: establishing a secure transport between a slave node and a timing server node in a communications network; mutually authenticating the slave node and the timing server node; exchanging, between the slave node and the timing sever node, encrypted ToP packets via the secure transport.

An exemplary apparatus includes one or more processors and one or more memories including computer program code. The one or more memories and the computer program code are configured to, with the one or more processors, cause the apparatus to perform at least the following: establishing, based on a security policy database, an internet key exchange security association between a gateway node and an access node in a wireless communication systems; creating multiple child security associations comprising at least one or more security associations to use exclusively for a packet-based two-way message exchange protocol for synchronizing clocks between the gateway node and the access node; collecting the one or more exclusive security associations in a security associations database; embedding, in internet protocol packets at wireless communication nodes, timing information with one of the one or more exclusive security associations from the security association database; creating one or more internet protocol security tunnels between the gateway node and the access node based on the one or more security associations; encrypting the packets; exchanging the packets between the gateway node and the access node; and authenticating the packets with a security parameter index.

An exemplary apparatus could also include various means for assigning, in a first timing module of a first node in a wireless communication system, a first timestamp to a ToP egress packet to a second node in wireless communication system, wherein the egress packet comprises a timestamp when the packet leaves the first timing module, adjusted by an estimated offset, and a packet identification; encrypting the egress packet; marking, in a second timing module, a second timestamp after the encrypting, wherein the encrypting is just prior to the transmitting of the egress packet; calculating an actual offset for the egress packet as the difference between the second timestamp and the first timestamp; and transmitting the egress packet to the second node via a secure transport.

An exemplary apparatus could also include various means for receiving an ingress encrypted ToP packet in a second timing module of a second node in a wireless communication system from a first node via a secure transport; decrypting the ingress encrypted ToP packet to retrieve a ToP packet; and applying a timestamp to the ToP packet using a local timing module.

An exemplary apparatus could also include various means for determining a list of servers for a timing service; resolving specified domain names with secure name servers from the determined list; creating a prioritized list of preferred servers from the specified names; choosing a most preferred server from the created prioritized list to avail timing service; and establishing a secure transport with the most preferred server.

An exemplary apparatus could also include various means for establishing a secure transport between a slave node and a timing server node in a communications network; mutually authenticating the slave node and the timing server node; exchanging, between the slave node and the timing sever node, encrypted ToP packets via the secure transport.

An exemplary apparatus could also include various means for establishing, based on a security policy database, an internet key exchange security association between a gateway node and an access node in a wireless communication systems; creating multiple child security associations comprising at least one or more security associations to use exclusively for a packet-based two-way message exchange protocol for synchronizing clocks between the gateway node and the access node; collecting the one or more exclusive security associations in a security associations database; embedding, in internet protocol packets at wireless communication nodes, timing information with one of the one or more exclusive security associations from the security association database; creating one or more internet protocol security tunnels between the gateway node and the access node based on the one or more security associations; encrypting the packets; exchanging the packets between the gateway node and the access node; and authenticating the packets with a security parameter index An exemplary computer program product includes a computer-readable storage medium bearing computer program code embodied therein for use with a computer. The computer program code includes code for: assigning, in a first timing module of a first node in a wireless communication system, a first timestamp to a ToP egress packet to a second node in wireless communication system, wherein the egress packet comprises a timestamp when the packet leaves the first timing module, adjusted by an estimated offset, and a packet identification; encrypting the egress packet; marking, in a second timing module, a second timestamp after the encrypting, wherein the encrypting is just prior to the transmitting of the egress packet; calculating an actual offset for the egress packet as the difference between the second timestamp and the first timestamp; and transmitting the egress packet to the second node via a secure transport.

An exemplary computer program product includes a computer-readable storage medium bearing computer program code embodied therein for use with a computer. The computer program code includes code for: receiving an ingress encrypted ToP packet in a second timing module of a second node in a wireless communication system from a first node via a secure transport; decrypting the ingress encrypted ToP packet to retrieve a ToP packet; and applying a timestamp to the ToP packet using a local timing module.

An exemplary computer program product includes a computer-readable storage medium bearing computer program code embodied therein for use with a computer. The computer program code includes code for: determining a list of servers for a timing service; resolving specified domain names with secure name servers from the determined list; creating a prioritized list of preferred servers from the specified names; choosing a most preferred server from the created prioritized list to avail timing service; and establishing a secure transport with the most preferred server.

An exemplary computer program product includes a computer-readable storage medium bearing computer program code embodied therein for use with a computer. The computer program code includes code for: establishing a secure transport between a slave node and a timing server node in a communications network; mutually authenticating the slave node and the timing server node; exchanging, between the slave node and the timing sever node, encrypted ToP packets via the secure transport.

An exemplary computer program product includes a computer-readable storage medium bearing computer program code embodied therein for use with a computer. The computer program code includes code for: establishing, based on a security policy database, an internet key exchange security association between a gateway node and an access node in a wireless communication systems; creating multiple child security associations comprising at least one or more security associations to use exclusively for a packet-based two-way message exchange protocol for synchronizing clocks between the gateway node and the access node; collecting the one or more exclusive security associations in a security associations database; embedding, in internet protocol packets at wireless communication nodes, timing information with one of the one or more exclusive security associations from the security association database; creating one or more internet protocol security tunnels between the gateway node and the access node based on the one or more security associations; encrypting the packets; exchanging the packets between the gateway node and the access node; and authenticating the packets with a security parameter index.

BRIEF DESCRIPTION OF THE DRAWINGS

For a more complete understanding of examples of embodiments of the present invention, reference is now made to the following descriptions taken in connection with the accompanying drawings in which:

FIG. 4B is an example of a tabulation;

FIG. 4C is an example of another tabulation;

FIG. 4D is an example of a histogram used to determine a mean;

FIG. 7 is a pictorial depiction of an exemplary embodiment of the egress path method.

Figure 1:
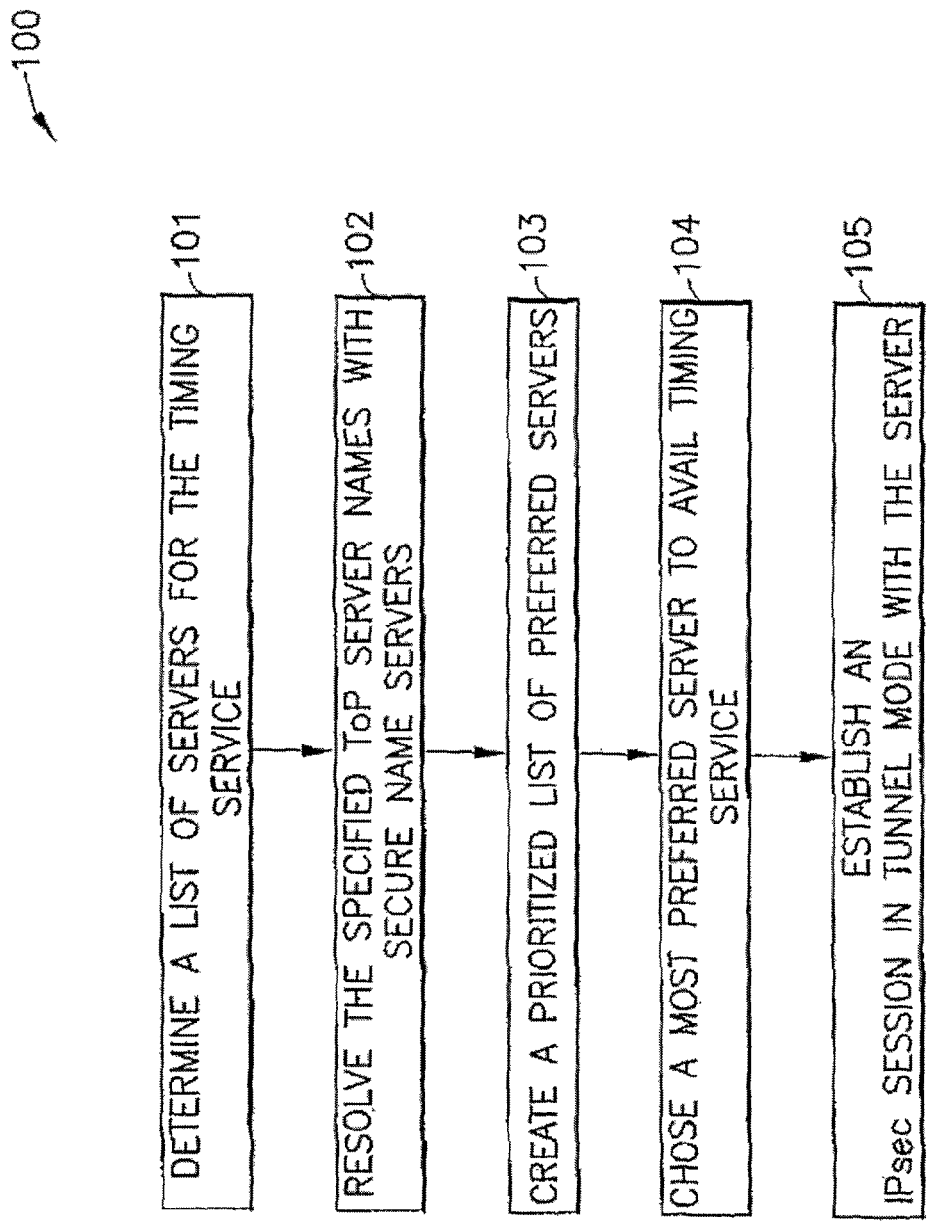
FIG. 1 is a flow diagram showing operations for an exemplary method of establishing a trusted timing service.

The word "exemplary" is used herein to mean "serving as an example, instance, or illustration." Any embodiment described herein as "exemplary" is not necessarily to be construed as preferred or advantageous over other embodiments. All of the embodiments described in the Detailed Description are exemplary embodiments provided to enable persons skilled in the art to make or use the invention and not to limit the scope of the invention which is defined by the claims.

DETAILED DESCRIPTION OF THE DRAWINGS

As stated earlier, time synchronization is necessary for various applications. In this invention disclosure we provide a framework and method to securely communicate and exchange timing packets over an inherently insecure public network. We also provide a mechanism to account for variances in processing delay incurred due to security processing and encryption. Additionally, our framework ensures that the client only avails timing service from trusted sources.

We disclose herein our method to secure timing packets over untrusted packet transport network. The invention provides a secure connection for timing messages over an insecure public network between H(e)NB and SeGW (between small cells and LTE core). The invention uses IPSec tunnel for Synchronization plane traffic with low latency. Mutual authentication of two communicating wireless nodes is done using IPSec.

An invented method includes the aspect that slave nodes shall only take timing service from trusted Grand Master Clocks and Boundary clocks. For resolving the timing server address a secure naming service (secure DNS) shall be used instead of standard naming service. A list of preferred timing servers for a given network node is created. This list is then prioritized. The list is also refreshed at certain time intervals.

Another invented method includes the aspect that a secure IPsec tunnel with the trusted timing source is established between the access point and GW. The successful exchange of IPsec IKE messages between the slave and timing server network nodes provides authentication of the timing server. The operator sets a lifetime for these secure tunnels per the operator policies.

Another invented method prescribes an exclusive SPI to identify an embedded 1588v2 packet inside IPsec ESP payload at end systems (e.g., gateway or AP) while providing security and anonymity for ToP packets in the larger network. After securing both ends of connection with IPsec tunnel, an exclusive Security Association is used for Precision Time Protocol traffic so that the receiving node is able to identify 1588v2 inside IPsec ESP. IEEE 1588v2 Precision Time Protocol (PTP) is a packet-based two-way message exchange protocol for synchronizing clocks between nodes in a network Another invented method teaches ingress (or receiving end) hardware timestamping in an Ethernet switch which is done based on source/destination IP and Security Parameter Index (SPI). Ingress 1588 in IPsec messages can then get an extra "edge" hardware timestamp ($t_2'$, $t_4'$) and extra offset ($t_2-t_2'$, $t_4-t_4'$). This invented method also teaches that the egress (or transmitting end) will put a statistically estimated edge timestamp offset ($t_1'-t_1$ for SYNC; $t_3'-t_3$ for Delay_Req) in the Residence Time field before SYNC and Delay_Req are encrypted in IPsec ESP payload, thereby allowing the slave clock Servo algorithm to offset the delay/jitter introduced by IPsec for 1588 ToP egress packets. Both end systems of the tunnel shall have the SPI associated with tunnel used for transferring ToP packets, but it is unknown to other nodes in the larger network, which helps mitigate various man-in-the-middle attacks.

Furthermore, with another invented method, the anonymity for the timing packets can further be enhanced by adding random amount (variable) padding to the IPsec payload (at the tail end of the ToP packets carried in IPsec tunnel).

An example of embodiments of the present invention and its potential advantages are understood by referring to FIG. 1 through FIG. 7 of the drawings.

FIG. 1 depicts a flow chart of an exemplary method of a trusted timing service 100 as taught herein which uses secure naming service to identify and prioritize available secure and trusted ToP servers for clients to avail timing service.

Since IEEE 802.1AS-2011 is basically a subset of IEEE 1588-2008, we will refer to 1588 in the following paragraphs as the primary ToP protocol. Nonetheless, all such references are non-limiting and used herein only for convenience.

In a typical 1588 deployment environment the GMC and BC send "Announce" messages which are used by the slave nodes to learn about the availability of a timing server in the network and avail timing services from a most accurate timing server without any regard to security aspects. This model causes problem when timing service is as critical as it is for certain cellular services and when some of these network nodes are connected through inherently insecure best effort public networks, as is the case for many small cell deployments connected to the larger network over insecure best effort cable/DSL connections.

In our invention we propose the slave nodes shall only avail timing service from the trusted timing GMCs and BCs. The following method shall ensure the timing source availed by a given network node is secure and authenticated.

The method for a trusted timing service 100 first has the operator determine a list of servers for the timing service 101. Thus, the operator pre-configures servers but this configuration can be changed as needed to address different operation scenarios by the O&M system over a secure connection.

Next, the operator resolves the ToP server names with secure name servers 102. This would allow a single domain name to be resolved to different target servers based on the location of a given slave node and origin of the request, improve the accuracy of the timing service, and facilitate even distribution of network load and address deployment scaling aspects. For resolving the timing server address a secure naming service (secure DNS) shall be used instead of standard naming service. This is done to ensure that the name resolution is not compromised.

Once a list of potential servers for timing service are available, the list is prioritized, which can be based on, for example, operator policies, network latency for a given server, the server capabilities, clock accuracy for a given server, etc. At the end of this process a prioritized list of preferred timing servers for a given network node is created 103. This prioritized list is refreshed at certain time intervals, in case of failure of a certain number of tunnel set up attempts or operator O&M intervention.

From the prioritized list of available timing servers, the most preferred server is chosen to avail timing service 104. The slave shall attempt to establish an IPsec session in tunnel mode with the server 105. Internet Protocol Security (IPsec) is a protocol suite for securing Internet Protocol (IP) communications by authenticating and encrypting each IP packet of a communication session.

Figure 2:
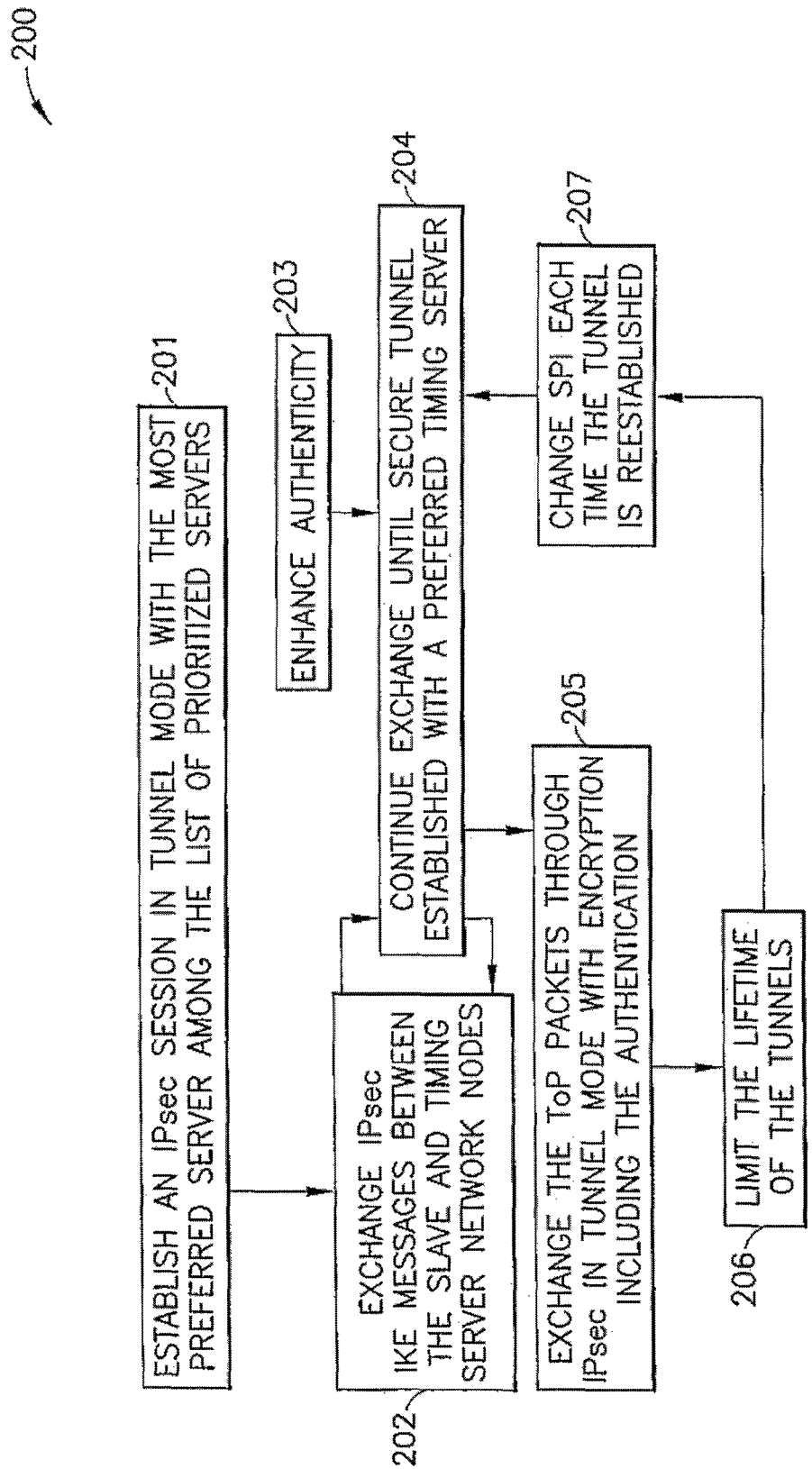
FIG. 2 is a flow diagram showing operations for an exemplary method of establishing a secure tunnel with the trusted timing source.

FIG. 2 displays our method to establish a secure tunnel with the trusted timing source 200. Essentially, we teach that a unique, exclusive, time varying security association is used for PTP packets on both the receiving and transmitting ends to establish secure tunnel with the trusted timing source.

The slave shall attempt to establish an IPsec session in tunnel mode with the most preferred server among the list of prioritized servers 201. A successful exchange of IPsec IKE messages between the slave and timing server network nodes 202 establishes the authenticity of the timing server. Domain specific, pre-configured, or third party signed certificates may be used during IPsec session setup to further enhance authenticity of the timing server 203. This process shall continue till a secure tunnel is established with a preferred timing server 204.

IPsec in tunnel mode with encryption including the authentication option shall be used to exchange the ToP packets 205. The operator shall set a lifetime for these secure tunnels per the operator policies 206. The limited lifetime of the tunnels and perfect forward secrecy of the keying material for the tunnels ensure continued security of the ToP packets exchanged in the secure tunnel. The SPI changes every time the tunnel is reestablished 207, which, together with the tunnel's limited lifetime, enhances security for the ToP packets exchanged in these tunnels.

Figure 3:
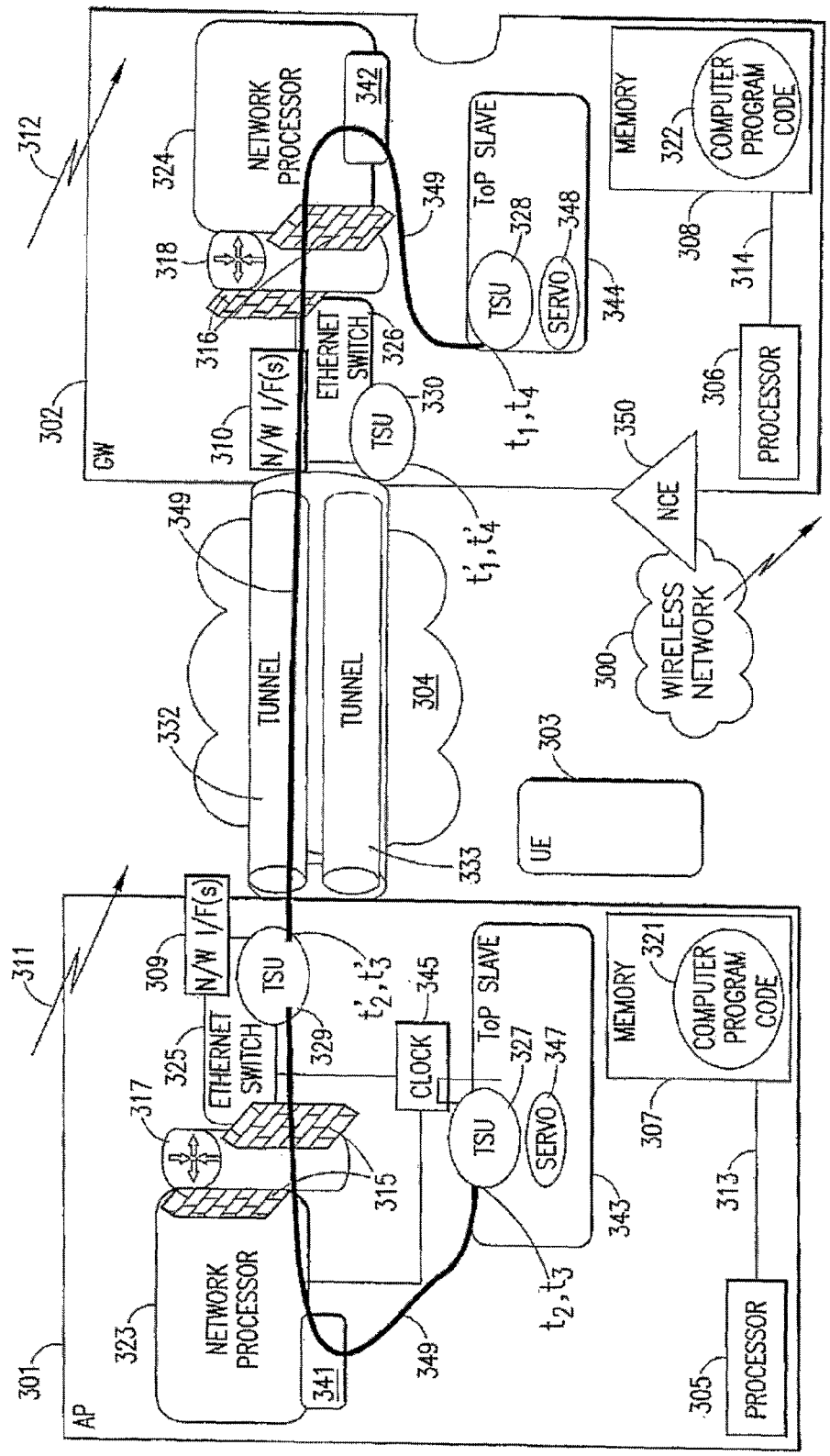
FIG. 3 is a block diagram of an exemplary system in which the exemplary embodiments may be practiced.

FIG. 3 shows a block diagram of an exemplary system in which the exemplary embodiments may be practiced depicting a non-limiting physical embodiment of our secure ToP message identification method.

1588 relies on hardware time stamping unit (TSU) for very high precision on recovered frequency and timing synchronization accuracy that can meet the synchronization requirements of 4G LTE/LTE-A features.

However, once 1588v2 PTP packets are placed into IPsec tunnel in ESP (Encrypted Security Payload) tunnel mode, the edge Ethernet switch 1588v2 capable chipset can no longer identify 1588v2 packets inside IPsec ESP payload since they are encrypted. On ingress side, 1588v2 servo engine inside the receiving node (e.g., AP) will need to wait until IPsec ESP tunnel is terminated and payload is decrypted and then perform the timestamping operation. On the egress side or transmitting end, 1588v2 servo engine cannot rely on the edge Ethernet switch to insert the timestamp when 1588v2 packet actually leaves the transmitting node (e.g., GW). It has to insert the timestamp first and then send it to the network processor security accelerator to put into an IPsec ESP tunnel. IPsec ESP introduces additional jitter and latency for 1588v2 traffic and thus negatively impacts the performance.

We propose to address this problem by using exclusive Security Associations (SAs) with limited lifetime as specified by an operator for a given deployment, to allow the receiving node to identify 1588v2 inside IPsec ESP, and perform statistical estimation of the edge timestamp offset to offset the delay/jitter introduced by IPsec.

The AP 301 is a base station that provides access by wireless devices such as the UE 303 to the wireless network 300. The AP 301 includes one or more processors 305 shown generally, one or more memories 307 shown generally, one or more network interfaces (N/W I/F(s)) 309, and one or more transceivers 311 interconnected through one or more buses 113 shown as an example. Each of the one or more transceivers 311 includes a receiver, Rx, and a transmitter, Tx, not shown. The one or more transceivers 311 are connected to one or more antennas, also not shown. The one or more memories 307 include computer program code 321. The AP 301 includes a Network Processor module 323, an Time Stamp module 329 associated with an Ethernet Switch 325, and Time Stamp module 327 associated with a ToP Slave 343 and Servo 347, each of the modules comprising one of or both parts 323-1 and/or 323-2, 329-1 and/or 329-2, and 327-1 and/or 327-2, respectively, which may be implemented in a number of ways.

The Network Processor module 323 may be implemented in hardware as Network Processor module 323-1, such as being implemented as part of the one or more processors 305. The Network Processor module 323-1 may be implemented also as an integrated circuit or through other hardware such as a programmable gate array. In another example, the Network Processor module 323 may be implemented as Network Processor module 323-2, which is implemented as computer program code 321 and is executed by the one or more processors 305. For instance, the one or more memories 307 and the computer program code 321 are configured to, with the one or more processors 305, cause the AP 301 to perform one or more of the operations as described herein.

The Ethernet associated Time Stamp module 329 may be implemented in hardware as Time Stamp module 329-1, such as being implemented as part of the one or more processors 305. The Time Stamp module 329-1 may be implemented also as an integrated circuit or through other hardware such as a programmable gate array. In another example, the Time Stamp module 329 may be implemented as Time Stamp module 329-2, which is implemented as computer program code 321 and is executed by the one or more processors 305. For instance, the one or more memories 307 and the computer program code 321 are configured to, with the one or more processors 305, cause the AP 301 to perform one or more of the operations as described herein.

The ToP Slave associated Time Stamp module 327 may be implemented in hardware as PHY Time Stamp Unit. The ToP Slave associated Time Stamp module 327 may also be implemented in hardware as Time Stamp module 327-1, such as being implemented as part of the one or more processors 305. The Time Stamp module 327-1 may be implemented also as an integrated circuit or through other hardware such as a programmable gate array. In another example, the Time Stamp module 327 may be implemented as Time Stamp module 327-2, which is implemented as computer program code 321 and is executed by the one or more processors 305. For instance, the one or more memories 307 and the computer program code 321 are configured to, with the one or more processors 305, cause the AP 301 to perform one or more of the operations as described herein.

Similarly other discrete elements in AP 301 may also be implemented via an integrated circuit or via hardware associate with computer program code.

The one or more network interfaces 309 communicate over a network such as via the IPsec Tunnel links 332 and 333, which may be wired or wireless or both and may implement. Note that the transit route 349 of the secure timing messages discussed herein passes only through tunnel 332. Tunnel 332 is only for the secure timing messages and its creation is discussed in more detail below. Tunnel 333 is the tunnel used by the control plane, the user plane, and management functions for example but not for the timing synchronization as taught herein. The path of the timing sync message 349 is shown going through tunnel 332 which is exclusive to the timing sync message, ending at IP Sec tunnel termination point 341.

Additionally, slave 343, time stamp unit 327, Network Processor 323, and Time Stamp Unit 329 are all connected with clock 345.

The one or more buses 313 may be address, data, or control buses, and may include any interconnection mechanism, such as a series of lines on a motherboard or integrated circuit, fiber optics or other optical communication equipment, wireless channels, and the like. For example, the one or more transceivers 311 may be implemented as a remote radio head not shown, with the other elements of the AP 301 being physically in a different location from the remote radio head, and the one or more buses 313 could be implemented in part as fiber optic cable to connect the other elements of the AP 301 to the remote radio head.

Turning to other devices in FIG. 3, The GW 302 is a base station that provides access by wireless devices such as the UE 103 to the wireless network 300. The GW 302 includes one or more processors 306 shown generally, one or more memories 308 shown generally, one or more network interfaces (N/W I/F(s)) 310, and one or more transceivers 312 interconnected through one or more buses 314 shown as an example. Each of the one or more transceivers 312 includes a receiver, Rx, and a transmitter, Tx, not shown. The one or more transceivers 312 are connected to one or more antennas, also not shown. The one or more memories 307 include computer program code 322. The GW 302 includes a Network Processor module 324, an Time Stamp module 130 associated with an Ethernet Switch 326, and Time Stamp module 328 associated with a ToP Slave 344 and Servo 348, each of the modules comprising one of or both parts 324-1 and/or 324-2, 330-1 and/or 330-2, and 328-1 and/or 328-2, respectively, which may be implemented in a number of ways.

The Network Processor module 324 may be implemented in hardware as Network Processor module 324-1, such as being implemented as part of the one or more processors 306. The Network Processor module 324-1 may be implemented also as an integrated circuit or through other hardware such as a programmable gate array. In another example, the Network Processor module 324 may be implemented as Network Processor module 324-2, which is implemented as computer program code 322 and is executed by the one or more processors 306. For instance, the one or more memories 308 and the computer program code 322 are configured to, with the one or more processors 306, cause the GW 302 to perform one or more of the operations as described herein.

The Ethernet associated Time Stamp module 330 may be implemented in hardware as Time Stamp module 330-1, such as being implemented as part of the one or more processors 306. The Time Stamp module 330-1 may be implemented also as an integrated circuit or through other hardware such as a programmable gate array. In another example, the Time Stamp module 330 may be implemented as Time Stamp module 330-2, which is implemented as computer program code 322 and is executed by the one or more processors 306. For instance, the one or more memories 308 and the computer program code 322 are configured to, with the one or more processors 306, cause the GW 302 to perform one or more of the operations as described herein.

The ToP GMC associated Time Stamp module 328 may be implemented in hardware as PHY Time Stamp Unit. The ToP GMC associated Time Stamp module 328 may also be implemented in hardware as Time Stamp module 328-1, such as being implemented as part of the one or more processors 306. The Time Stamp module 328-1 may be implemented also as an integrated circuit or through other hardware such as a programmable gate array. In another example, the Time Stamp module 328 may be implemented as Time Stamp module 328-2, which is implemented as computer program code 322 and is executed by the one or more processors 106. For instance, the one or more memories 308 and the computer program code 322 are configured to, with the one or more processors 306, cause the GW 302 to perform one or more of the operations as described herein.

Similarly other discrete elements in GW 302 may also be implemented via an integrated circuit or via hardware associate with computer program code.

The one or more network interfaces 310 communicate over a network such as via the IPsec Tunnel links 332 and 333, which may be wired or wireless or both and may implement. Note that the transit route 349 of the secure timing messages discussed herein passes only through tunnel 332. Tunnel 332 is only for the secure timing messages and its creation is discussed in more detail below. Tunnel 333 is the tunnel used by the control plane, the user plane, and management functions for example but not for the timing synchronization as taught herein. The path of the timing sync message 349 is shown going through tunnel 332 which is exclusive to the timing sync message, ending at IP Sec tunnel termination point 342.

Ethernet switch 326 is a deep packet inspection capable Ethernet switch and is connected to Network Processor 324 through IP Sec tunnel 318 and firewall 316.

The one or more buses 314 may be address, data, or control buses, and may include any interconnection mechanism, such as a series of lines on a motherboard or integrated circuit, fiber optics or other optical communication equipment, wireless channels, and the like. For example, the one or more transceivers 312 may be implemented as a remote radio head not shown, with the other elements of the GW 302 being physically in a different location from the remote radio head, and the one or more buses 314 could be implemented in part as fiber optic cable to connect the other elements of the GW 302 to the remote radio head.

Additionally, GW 302 is connected to the master clock of wireless network 300.

The wireless network 100 may include a network control element (NCE) 350 that may include MME/SGW functionality, and which provides connectivity with a further network, such as a telephone network and/or a data communications network (e.g., the Internet). The GW 302 is coupled via a link to the NCE 350. The link may be implemented as, e.g., an S1 interface. The internal workings of NCE 350, which are not shown, includes one or more processors, one or more memories, and one or more network interfaces, interconnected through one or more buses. The one or more memories include computer program code. The one or more memories and the computer program code are configured to, with the one or more processors, cause the NCE 350 to perform one or more operations.

The wireless network 300 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented using hardware such as processors and memories.

The computer readable memories 307 and 308 may be of any type suitable to the local technical environment and may be implemented using any suitable data storage technology, such as semiconductor based memory devices, flash memory, magnetic memory devices and systems, optical memory devices and systems, fixed memory and removable memory. The processors 305 and 306 may be of any type suitable to the local technical environment, and may include one or more of general purpose computers, special purpose computers, microprocessors, digital signal processors (DSPs) and processors based on a multi-core processor architecture, as non-limiting examples.

UE 303 can be used in wireless communication with a wireless network 300 or with base stations of wireless network 300 or with access points such as AP 301. The user equipment 303 includes one or more processors, one or more memories, and one or more transceivers interconnected through one or more buses. Each of the one or more transceivers includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers are connected to one or more antennas. The one or more memories include computer program code.

The UE 303 includes a module which may be implemented in a number of ways. The module may be implemented in hardware, such as being implemented as part of the one or more processors. The module may be implemented also as an integrated circuit or through other hardware such as a programmable gate array. In another example, the module may be implemented as computer program code and is executed by the one or more processors. For instance, the one or more memories and the computer program code may be configured to, with the one or more processors, cause the user equipment 303 to perform one or more of the operations as described herein. The UE 303 communicates with AP 301 via a wireless link.

In general, the various implementations of the user equipment 303 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 3. A computer-readable medium may comprise a computer-readable storage medium (e.g., memories 307 and 308 or other device) that may be any media or means that can contain or store the instructions for use by or in connection with an instruction execution system, apparatus, or device, such as a computer.

As can be seen by referring to FIG. 3, the time $t_3$ is the time that the timing message leaves the first module. As an example, first module follows 1588 protocols and is a ToP slave. The timing method is then encrypted using the deep packet inspection capable ethernet software. At that point, the time is also time stamped and this time would be referred to as $t_3'$. Since it takes time to encrypt packet, we measure both the time that the unencrypted message leaves the first module and the time after the message is encrypted but just before it proceeds through the IP sec tunnel. The difference between $t_3$ and $t_3'$ is the offset time caused by the encryption. Thus, from the egress side, the timestamp assigned by the timing module for egress packets (T) is expressed by $T=t_3+$ (an estimated offset).

Similarly, on the ingress side, $t_2$ is the actual time the packet arrives and is transformed by the timing module and $t_2'$ is the time at which encrypted timing message arrives at the device. Again, the difference between $t_2$ and $t_2'$ is the offset caused by the decryption.

In this way, the time that the access point eventually calculates and the time that the gateway delivered to the access point from the master clock will correspond minus the latency between the machines, for example, that of going through the internet.

The end systems timing server and slave shall have their IPsec policy defined such that a dedicated IPsec tunnel with authentication (AH) and encryption (ESP) support shall be established. The tunnel shall have a limited lifetime and shall be refreshed from time to time as needed. Both end systems of the tunnel shall have the SPI associated with tunnel used for transferring ToP packets, but it is unknown other nodes in the larger network, this will help mitigate various man-in-the-middle attacks. The anonymity for the ToP packets can further be enhanced by adding random amount (variable) padding to the IPsec payload (at the tail end of the ToP packets carried in IPsec tunnel).

As discussed, we use exclusive SA (Security Association) for 1588 traffic and unique SPIs (Security Parameter Index) for 1588 traffic, though this use is for example and not limiting.

Our method introduces delay/jitter because of the IPsec. However, the time need to encrypt the timing messages is not a constant. Thus, the offset would also not be a constant. To remedy the variance of offset values, over various iterations the offset times are collected, perhaps in a table, and these values are entered into a histogram to find a mean value. With this mean value the timing can be regulated more accurately. In other words, a statistical mean of the value of the latency is created such that an average offset based on a running average can be created to add to $t_3$.

Therefore, we perform statistical analysis on the edge timestamp offset to estimate the internal security provisioning delay on egress path.

Figure 4A:
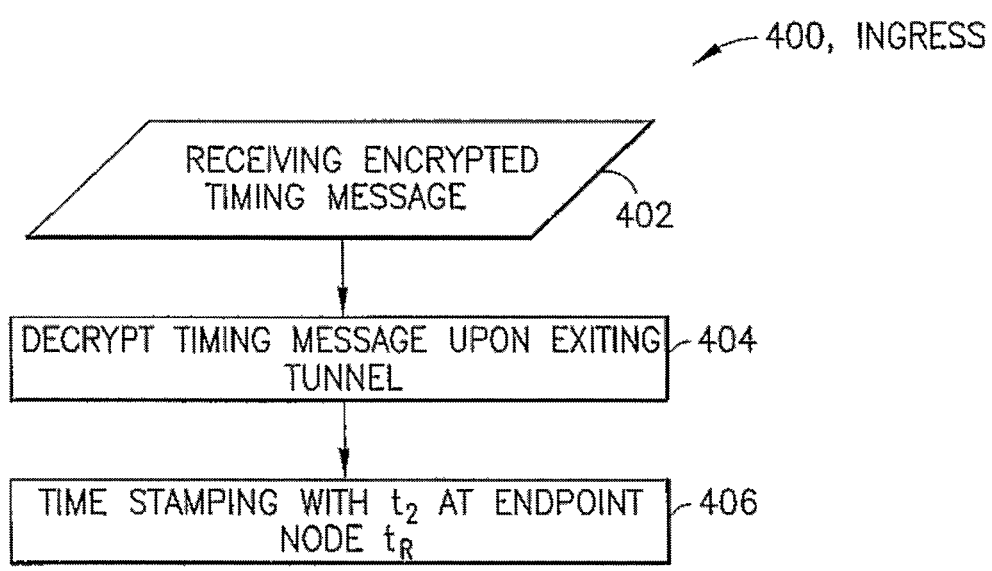
FIG. 4A is a block diagram of an example of Secure ToP Ingress (Receiving End)

In the ingress path 400, also shown in FIG. 4A, when the packet arrives it is decrypted and after decryption the timestamp $t_2$ is applied by the timing module. A tabulation may be made as shown in FIG. 4B.

At a receiving node, an encrypted timing message enters 402. In our example, the timing message is an IPSec message in ESP tunnel mode. This tunnel is solely for the use of such timing messages, such that the tunnel is exclusive to the encrypted timing messages. When the encrypted message exits the tunnel, only then can it be decrypted 404. The decrypted message is then time stamped upon arrival at the ToP timing solution module 406. The anonymity for the timing packets can further be enhanced by adding random amount (variable) padding to the IPsec payload (at the tail end of the ToP packets carried in IPsec tunnel).

Egress (or transmitting end) 1588 in IPsec will put a statistically estimated edge timestamp offset ($t_1'-t_1$ for SYNC; $t_3'-t_3$ for Delay_Req) in the Residence Time field before SYNC and Delay_Req are encrypted in IPsec ESP payload, allowing the ToP slave clock Servo algorithm to offset the delay/jitter introduced by IPsec for 1588 ToP egress packets.

The timestamp assigned by timing module for egress packets (t) t=$t_3$+(estimated offset), where $t_3$ is the time the packet leaves the timing module and where $t_3'$ is the time packet reaches PHY after encryption by IPSec engine. The time $t_3'$ and associated packet ID (P) are sent to the s/w on SoC for collating the packet and calculating the offset for creating distribution. The times are tabulated, for example, as shown in FIG. 4C.

A mean of ($t_3'-t_3$) from the distribution will give the mean offset value t that can be used to find the estimated offset in the path due to encryption. The mean can be determined, for example, by the use of a histogram, as shown in FIG. 4D.

The distribution calculates running/moving mean of the offset based on egress 1588v2 packets. Distribution of offset to determine mean estimated offset for large sample.

Additionally, the estimated offset t is periodically passed to the timing module to correct the time-stamp for inner packet by adding to original time $t_3$.

Also, the timing module needs to maintain mapping of packet ID (outer/encrypted to time $t_3'$). Only the SoC has this outer to inner packet ID mapping and needs to be maintained to collate time per sample.

SPIo' is sent to PHY upon change to PHY/DPI over MDIO by SoC IPSec engine.

Referring to FIG. 3 again and following the path of the encrypted message, this instance a time stamp module, for example, the time stamp module 327 associated with the ToP slave module 343 timestamps $t_3$. Then the message is encrypted and just before it exits the node, now designated as the transmitting node, the time stamp module 329 records the time that the encrypted message exits, designated as $t_3'$.

Figure 5:
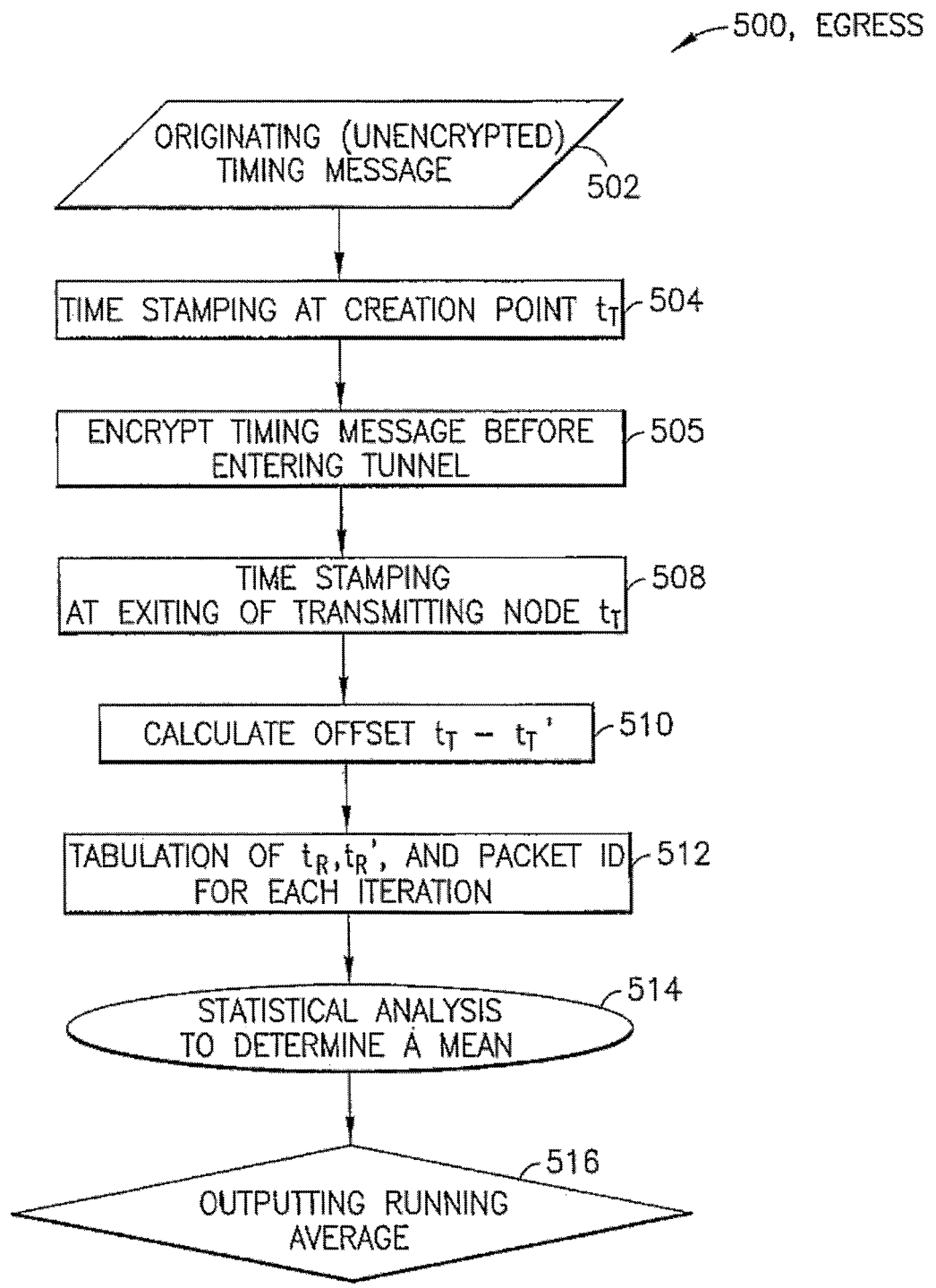
FIG. 5 is a block diagram of an example of Secure ToP Egress (Transmitting End)

FIG. 5 is a flow diagram of an example of an embodiment of the determining the offset from the egress side.

At a transmitting node, an unencrypted timing message originated at a clock 502 and is timestamped 504. The message is then encrypted 506. In our example, the timing message is encrypted as an IPSec message in ESP tunnel mode. This tunnel is solely for the use of such timing messages, such that the tunnel is exclusive to the encrypted timing messages. When the encrypted message leaves the transmitting node, a time stamp records that exit 508. For general purposes, we can refer to the time the unencrypted message is created as $t_T$, for transmitted time. The time is the startpoint. When the encrypted message enters the tunnel, it is already encrypted. Therefore, the message itself cannot be timestamped. Rather, the exit time is recorded. We can refer to that time as $t_T'$, for transmitted time prime. The offset caused by needing to encrypt the message is calculated as the $t_T-t_T'$ or in other words, the difference between the final arrival time and the time the encrypted message entered the receiving node. Hence the offset is calculated 510.

As discussed herein, the offset time will vary upon each use. So each time a message is transmitted, those individual offset times as calculated need to be tabulated 512. Putting these values into a histogram, a mean offset time can be determined 514, which allows for a running average to be determined 516.

The anonymity for the timing packets can further be enhanced by adding random amount (variable) padding to the IPsec payload (at the tail end of the ToP packets carried in IPsec tunnel).

Figure 6:
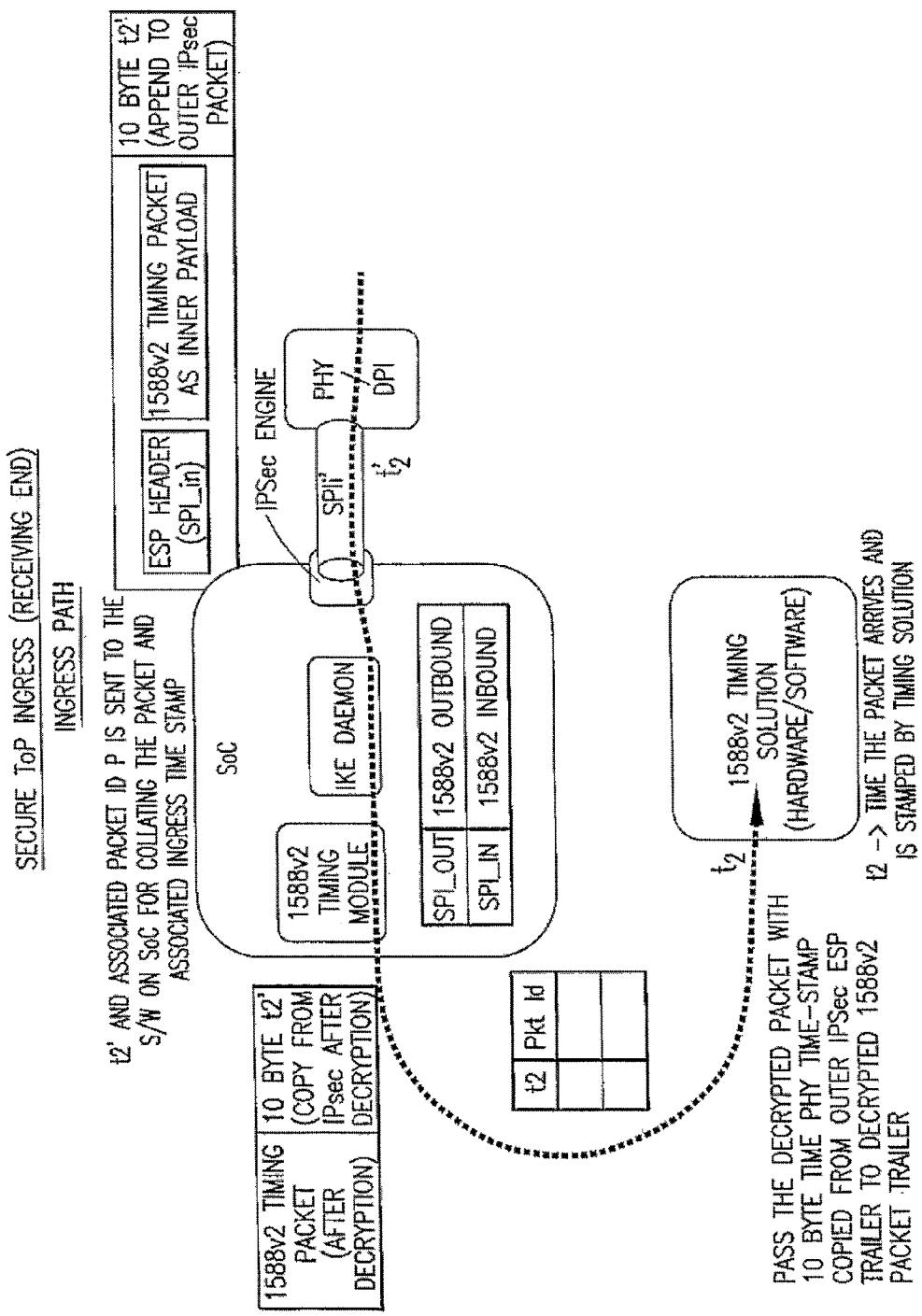
FIG. 6 is a pictorial depiction of an exemplary embodiment of the ingress path method.

FIG. 6 also depicts an exemplary embodiment of the ingress path method.

FIG. 7 also depicts an exemplary embodiment of the egress path method.

The figures generally, and FIG. 3, FIG. 6, and FIG. 7 in particular, can also serve as providing an example of a system to secure timing synchronization to network nodes connected over an inherently insecure best effort public network with mechanisms to improve accuracy of timing protocols such as a statistically estimated edge timestamp offset encoded into the timing message to account for network jitter and processing latency variances incurred due to the security packet processing and encryption; to ensure slave network nodes shall only accept timing messages from trusted timing sources; to establish a secure tunnel with a trusted timing source for exchange of timing packets; to provide authentication and security for timing packets over the insecure public network; and to enhance message anonymity with variable payload padding.

A secure DNS (Domain Naming Server) to be used to identify and prioritize available secure and trusted ToP servers for clients residing in a small cell that is needs to connect to the wireless network through the internet, for example, to avail itself of a timing service A unique, exclusive, periodically updated security association is provisioned for PTP packets on both the receiving and transmitting ends to establish secure tunnel with the trusted timing source.

Exclusive SPI for end points to identify an encrypted 1588v2 packet inside an IPsec ESP payload are provisioned at the end systems, such as a small cell gateway or AP for example, while providing security and anonymity for ToP packets transiting in the public insecure network which is inherently insecure.

Statistical analysis to estimate timing offset for both inbound & outbound PTP packets compensates for the additional latency/jitter introduced by IPsec encryption, decryption, and authentication.

Our solution addresses this need by having a separate SPI for PTP/1588v2 within the IPsec hence not only securing the link and allowing routability to FZAPs/small cells that are behind customer/enterprise network (non-owned untrusted transports). Plus it also improves on the error by providing offset estimation based on sample/historical data on the same network segment (running/moving average) that allows the operator to estimate/reduce any latency/jitter introduced by IPSec encryption/decryption for PTP packets and also maintaining the required security.

Other solutions that would leave PTP packets in the clear cannot work for cases where there are non-operator owned links/transports connecting between controllers/small cell gateways or if security is introduced via IPSec will introduce unwanted latency/jitter that increases the error and reduces the accuracy needed for sync plane especially and 4G and upcoming 5G type small deployments.

As of this disclosure, LTE 2346 assumes that 1588v2 is not inside the IPSec tunnel hence need the various Boundary Clock (BC) or Transparent Clock (TC) in the path to keep the sync packets corrected.

However, our solution allows routing PTP packets inside the IPSec tunnel on and eliminate the need for BC/TC on the way (actually BC/TC even if present wouldn't be able to distinguish among other IPSec packets). With our solution, the packets are now inside the IPSec tunnel.

As more wireless operators are using IP based transport, the security of the data in the transport network becomes a key requirement needed to protect the end users' data. The main scheme to protect the customers' data that is being widely used by the wireless operators is IPSec which uses encryption, integrity protection and authentication between the two end points (i.e., base stations and core network). In the base stations (or eNBs) that operate via packet based transport, IPSec is commonly used for the protection of User, Control and Management planes traffic.

However, the synchronization plane is not protected due to the nature of the synchronization traffic which requires the lowest possible latency plus symmetric uplink and downlink delays. Without in any way limiting the scope, interpretation, or application of the claims appearing below, a technical effect of one or more of the examples of embodiments disclosed herein is providing IPSec implementation scheme that can be extended to the Synchronization plane traffic in addition to User, Control and Management planes.

Additionally, a technical effect of one or more of the exemplary embodiments disclosed herein is providing secure timing synchronization to the network nodes connected over an inherently insecure best effort public network.

Another technical effect of one or more of the examples of embodiments disclosed herein is ensuring the slave network nodes shall only accept timing messages from trusted timing sources.

Another technical effect of one or more of the examples of embodiments disclosed herein is establishing secure tunnel with the trusted timing source for exchange of ToP timing packets over a public network which provides authentication and security for ToP packets over the insecure public network.

Another technical effect of one or more of the examples of embodiments disclosed herein is using statistical sampling and adjusting to improve accuracy, which takes into account network jitter and processing latency induced due to security packet processing.

Another technical effect of one or more of the exemplary embodiments disclosed herein is that enhancements provided by this method are self-contained at each node. Another technical effect of one or more of the examples of embodiments disclosed herein is that even with implementation of this method at one end point, it will provide security and improve the accuracy of the timing protocol significantly.

Another technical effect of one or more of the examples of embodiments disclosed herein is offering synchronization plane security is not currently being offered.

As can be seen from our disclosure, the currently disclosed subject matter addresses solutions not envisioned by the references discussed earlier. Specifically, US20090190613 very specifically states that an edge timestamp is applied to all packets and subsequently ignored by higher layers when the packet is recognized as something other than PTP. Also, US20090190613 only focused on the receiving end in which all packets must be timestamped, regardless of packet type. US20090190613 does not handle the transmit end, nor does it taking into account the security provisioning latency and jitter. It also does not address availing timing service from a trusted source.

In contrast to US20090190613, technical problems that might be addressed by embodiments disclosed herein, including possibly the embodiments encompassed by the current claims, include: achieving a method to ensure the slave network nodes shall only accept timing messages from trusted timing sources; a unique, exclusive, time varying security association used for PTP packets on both the receiving and transmitting ends; the use of SPI for packet identification using DPI capability at the switch; and the statistical methodology for actually estimating the internal security provisioning delay offset for edge timestamping on both the receiving and transmitting ends.

The Marvell IETF Draft while presenting requirements had no specific solution. It only identified the PHY timestamping issue by mentioning a possible solution to include an indication in the encryption header that identifies time protocol packets for timestamping, but the Marvell IETF Draft does not provide any detail what the solution might be. Moreover, the Marvell IETF Draft does not address how to compensate the performance degradation with 1588v2 inside IPsec tunnel. Our proposed solution clearly identifies the 1588 packets at end systems with exclusive SAs and performs statistical estimation to offset edge timestamp to compensate 1588v2 PTP performance degradation due to IPsec.

In contrast to the Huawei IETF Draft mentioned earlier, our solution does not require any changes to IPsec nor 1588v2. The proposed solution in the Huawei IETF Draft does not ensure anonymity of the 1588 traffic while in transit (addition of new WESP header). The proposed solution in the Huawei IETF Draft also does not prevent any rouge entity on the network to selectively drop, induce latency, or impact some of other manner the 1588v2 traffic as it is identifiable in transit. In contrast, our method does not require any modification of IPsec but instead using exclusive SAs for identification known only to the end points. Furthermore, a technical problem that might be addressed by embodiments, including possibly the embodiments encompassed by the current claims, is achieving an easier way of identification but also incorporating a statistical mean to estimate the edge offset to improve the 1588_over_IPsec accuracy.

While annex K of the IEEE 1588 provides security against network congestion and masquerading attack, there are no recommendations provided in the IEEE 1588 Annex K for preventing the selective packet delay attack. In contrast, a technical problem that might be addressed by embodiments disclosed herein, including possibly the embodiments encompassed by the proposed secure synchronization framework of the current claims, is preventing the selective packet delay attack.

Thus, we have developed the current invention, an example of an embodiment of which can be referred to as item 1, which is a method comprising: assigning, in a first timing module of a first node in a wireless communication system, a first timestamp to a ToP egress packet to a second node in wireless communication system, wherein the egress packet comprises a timestamp when the packet leaves the first timing module, adjusted by an estimated offset, and a packet identification; encrypting the egress packet; marking, in a second timing module, a second timestamp after the encrypting, wherein the encrypting is just prior to the transmitting of the egress packet; calculating an actual offset for the egress packet as the difference between the second timestamp and the first timestamp; and transmitting the egress packet to the second node via a secure transport.

An example of a further embodiment, which can be referred to as item 2, is the method of item 1 wherein the calculating the actual offset comprises using the packets associated with SPI of the tunnel intended for carrying the ToP packets.

An example of a further embodiment, which can be referred to as item 3, is the method of item 1 further comprising: tabulating actual offsets for a plurality of egress ToP packets; creating a distribution from the tabulating; and determining a mean offset from the distribution.

An example of a further embodiment, which can be referred to as item 4, is the method of item 1 further comprising: updating the estimated offset periodically with the determined mean offset.

An example of a further embodiment, which can be referred to as item 5, is the method of item 1 wherein the secure transport for the timing over packet comprises setting up an IPsec (Internet Protocol Security) session in tunnel mode, wherein processing ToP packets comprises a specific SPI for the session.

An example of another embodiment, which can be referred to as item 6, is method comprising: receiving an ingress encrypted ToP packet in a second timing module of a second node in a wireless communication system from a first node via a secure transport; decrypting the ingress encrypted ToP packet to retrieve a ToP packet; and applying a timestamp to the ToP packet using a local timing module.

An example of a further embodiment, which can be referred to as item 7, is the method of item 6, wherein the secure transport for the timing over packet comprises setting up an IPsec session in tunnel mode, wherein processing ToP packets comprises a specific SPI for the session.

An example of a further embodiment, which can be referred to as item 8, is the method of item 7, further comprising authenticating a node in wireless communication system to another node in the wireless communication system.

An example of another embodiment of the present invention, which can be referred to as item 9, is a method comprising: determining a list of servers for a timing service; resolving specified domain names with secure name servers from the determined list; creating a prioritized list of preferred servers from the specified names; choosing a most preferred server from the created prioritized list to avail timing service; and establishing a secure transport with the most preferred server.

An example of another embodiment of the present invention, which can be referred to as item 10, is a method comprising: establishing a secure transport between a slave node and a timing server node in a communications network; mutually authenticating the slave node and the timing server node; exchanging, between the slave node and the timing sever node, encrypted ToP packets via the secure transport.

An example of a further embodiment, which can be referred to as item 11, is the method of item 10, wherein the secure transport comprises an IPsec session in tunnel mode with the most preferred server among the list of prioritized servers, and wherein the secure keys comprise IPsec Internet Key Exchange messages.

An example of a further embodiment, which can be referred to as item 12, is the method of item 10, wherein establishing authenticity further comprises using domain specific, pre-configured, or third party signed certificates during IPsec session setup.

An example of a further embodiment, which can be referred to as item 13, is the method of item 10, wherein exchanging encrypted timing messages via the secure transport comprises exchanging ToP packets via an IPsec in tunnel mode with encryption including an authentication option.

An example of a further embodiment, which can be referred to as item 14, is the method of item 10, further comprising: setting, by an operator, a lifetime for the secure transport per a policy of the operator.

An example of a further embodiment, which can be referred to as item 15, is the method of item 14, further comprising: reestablishing the secure transport after expiration of the lifetime; and changing a security parameter index for each reestablishment.

An example of another embodiment of the present invention, which can be referred to as item 16, is a method comprising: establishing, based on a security policy database, an internet key exchange security association between a gateway node and an access node in a wireless communication systems; creating multiple child security associations comprising at least one or more security associations to use exclusively for a packet-based two-way message exchange protocol for synchronizing clocks between the gateway node and the access node; collecting the one or more exclusive security associations in a security associations database; embedding, in internet protocol packets at wireless communication nodes, timing information with one of the one or more exclusive security associations from the security association database; creating one or more internet protocol security tunnels between the gateway node and the access node based on the one or more security associations; encrypting the packets; exchanging the packets between the gateway node and the access node; and authenticating the packets with a security parameter index.

An example of a further embodiment, which can be referred to as item 17, is the method of item 16, wherein the embedding further comprises a 1588v2 packet inside IPsec ESP (Encapsulating Security Payload) payload.

An example of a further embodiment, which can be referred to as item 18, is the method of item 17, further comprising: adding a variable padding is to the IPsec payload, wherein the variable padding provides anonymity to the ToP packets in transit.

An example of a further embodiment, which can be referred to as item 19, the method of item 18, wherein standard ToP packet size cannot be used to identify the ToP packets in transit.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes examples of embodiments of the invention, these descriptions should not be viewed in a limiting sense. Rather, there are several variations and modifications which may be made without departing from the scope of the present invention.

Embodiments of the present invention may be implemented in software, hardware, application logic, or a combination of software, hardware, and application logic. The software, application logic and/or hardware may reside on 300, 301, 302, or 303 for example. If desired, part of the software, application logic and/or hardware may reside on 305, 307, 323, 325, or 343 for example, part of the software, application logic and/or hardware may reside on 306, 308, 324, 326, or 344 for example, and part of the software, application logic and/or hardware may reside on modules not depicted herein or on any combination of modules which would permit the performance of the invention.

In an example of an embodiment, the application logic, software, or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable storage medium that may be any media or means that can contain or store the instructions for use by or in connection with an instruction execution system, apparatus, or device, such as a computer.

Any of the examples of embodiments above can be performed by the use of an apparatus of, wherein a processor comprises at least one memory that contains executable instructions that if executed by the processor cause the apparatus to perform any of the various items described above.

Such an apparatus can comprise one or more processors and one or more memories that include computer program code. The one or more memories and the computer program code can be configured, with the one or more processors, to cause the apparatus to perform at least any of the various items described above.

Moreover, the invention can be practiced by a computer program product comprising a computer-readable storage medium bearing computer program code embodied therein for use with a computer, the computer program code comprising code for performing any of the various items described above.

A computer program, comprising code for performing any of the various items described above when the computer program is run on a processor.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes examples of embodiments of the invention, these descriptions should not be viewed in a limiting sense. Rather, there are several variations and modifications which may be made without departing from the scope of the present invention as defined in the appended claims.

What is claimed is:

1. A method comprising:
    assigning, in a first timing module of a first node in a wireless communication system, a first timestamp to a Timing over Packet (ToP) egress packet to a second node in wireless communication system, wherein the egress packet comprises a timestamp when the packet leaves the first timing module, adjusted by an estimated offset, and a packet identification;
    encrypting the egress packet;
    marking, in a second timing module, a second timestamp after the encrypting, wherein the encrypting is just prior to the transmitting of the egress packet;
    calculating an actual offset for the egress packet as the difference between the second timestamp and the first timestamp;
    transmitting the egress packet to the second node via a secure transport;
    tabulating actual offsets for a plurality of egress ToP packets;
    creating a distribution from the tabulating;
    determining a mean offset from the distribution; and
    updating the estimated offset periodically with the determined mean offset.

2. The method of claim 1, wherein the calculating the actual offset comprises using the packets associated with Security Parameter Index (SPI) of the tunnel intended for carrying the ToP packets.

3. The method of claim 1, wherein the secure transport for the timing over packet comprises setting up an Internet Protocol Security (IPsec) session in tunnel mode, wherein processing ToP packets comprises a specific Security Parameter Index (SPI) for the session.

* * * * *